United States Patent [19]
Jones et al.

[11] Patent Number: 6,078,595
[45] Date of Patent: Jun. 20, 2000

[54] TIMING SYNCHRONIZATION AND SWITCHOVER IN A NETWORK SWITCH

[75] Inventors: John Patrick Jones, Lexington; Raymond Schmidt, Stoughton; Eric L. Reed, Arlington; Patrick L. DeAngelis, Northborough; Mahesh N. Ganmukhi, Carlisle; Thomas A. Hoch, Stow; Brian Branscomb, Hopkinton, all of Mass.

[73] Assignee: Ascend Communications, Inc., Westford, Mass.

[21] Appl. No.: 08/920,250

[22] Filed: Aug. 28, 1997

[51] Int. Cl.$^7$ ........................................................ H04J 3/06
[52] U.S. Cl. ............................................ 370/503; 370/219
[58] Field of Search .................................... 370/219, 221, 370/225, 244, 522, 516, 503; 375/357, 371, 347, 226, 373, 376

[56] References Cited

U.S. PATENT DOCUMENTS

| | | | |
|---|---|---|---|
| 5,515,403 | 5/1996 | Sloan et al. | 375/371 |
| 5,638,410 | 6/1997 | Kuddes | 375/357 |
| 5,726,607 | 3/1998 | Brede et al. | 331/2 |

*Primary Examiner*—Chi H. Pham
*Assistant Examiner*—Kim T. Nguyen
*Attorney, Agent, or Firm*—Weingarten, Schurgin, Gagnebin & Hayes LLP

[57] ABSTRACT

A data communications switch and method of operation are presently disclosed enabling flexible, selectable provision of a common timing signal for synchronized external communication through physical layer interfaces with other network devices, synchronized internal communications within the switch, and for uninterrupted synchronization of such communications. Synchronization of external communications is enabled by programmable selection from among plural potential timing references at redundant timing modules (TMs). An active TM provides a primary external synchronization clock; a standby TM provides a redundant timing function. Both TMs access the same references. A state signal indicates which synchronization clock is active. External interfaces derive timing from this distributed clock. Synchronized internal timing is provided by an internal clock and phase-locked loop (PLL) on each TM. The clock/PLL timing signal output is routed to other switch elements, enabling synchronized internal data transfer. Both interconnected TMs actively generate clock signals for external and internal use, enabling seamless timing switchover should conditions warrant a change in TMs.

3 Claims, 12 Drawing Sheets

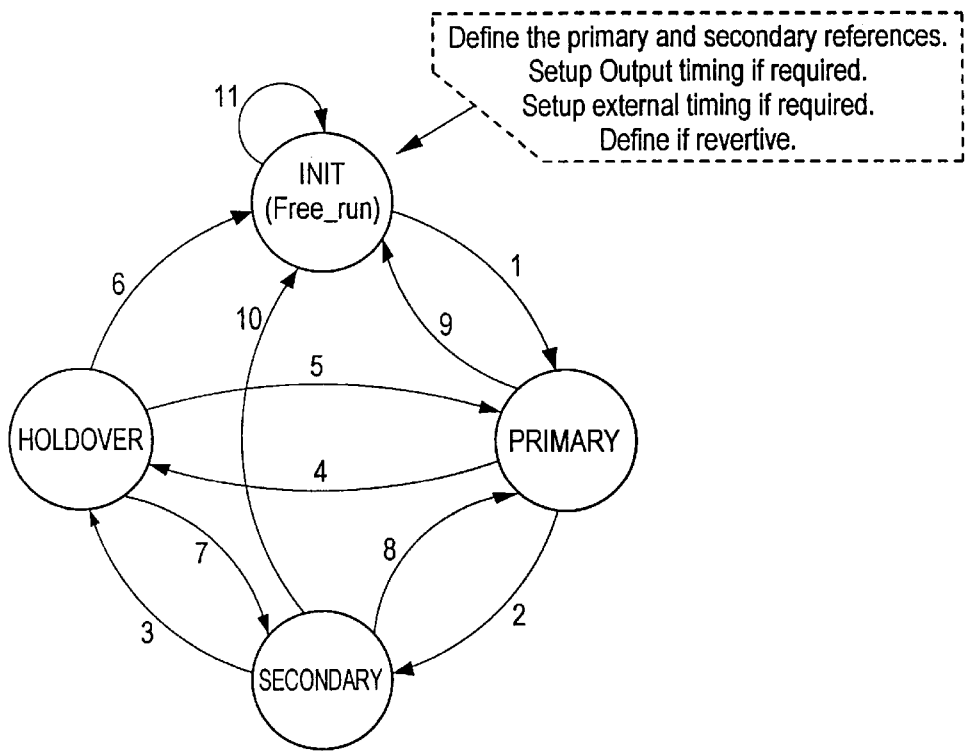

The State Transitions are defined as:
1. Enter Normal Operation (Primary is "good").
2. Error on Primary Ref (LOS, LOR, LOCK, Tune Limit, etc...).
   and Secondary Reference is "good".
3. Error on secondary, primary is still in error: enter holdover from secondary history.
4. Primary fails, secondary also in failure state: enter holdover from primary history.
5. Primary returns as "good" after an error state.
6. Holdover error, all references in failure: enter free run. Also re-initialization state.
7. Secondary returns as "good" after an error state, primary in failure state.
8. (a) Revertive operation: Primary "good" for 10<T<30.
   (b) Secondary fails, switch to primary if "good".
9. Primary fails, secondary still in failure, unable to holdover: defaults to free run state.
   Also re-initialization state.
10. Secondary fails, primary still in failure, unable to holdover: defaults to free run state.
    Also re-initialization state.
11. Initialization/default State when no references are configured or found to be "good".

*FIG. 6*

TIMING SYNCHRONIZATION AND SWITCHOVER IN A NETWORK SWITCH

CROSS REFERENCE TO RELATED APPLICATIONS

Not applicable

STATEMENT REGARDING FEDERALLY SPONSORED RESEARCH OR DEVELOPMENT

Not Applicable

BACKGROUND OF THE INVENTION

As data transfer speeds for network communications increase, timing among network system components becomes increasingly critical. To address this issue, highly accurate timing sources have been established which can provide common timing information to devices which in turn can distribute such common timing information to network system devices. Unfortunately, the direct distribution of such a highly accurate timing signal to the many elements which can be found in a common data communications network comes only at a high cost in terms of capital investment and space, power and cooling requirements. Further, due to the high data transfer speeds, synchronization between network elements must still be maintained.

For instance, a primary reference source or PRS, such as a highly accurate stratum 1 clock, is distributed through a wide-area/public network. Stratum 2 clocks are synchronized to the stratum 1 clock signal and serve to distribute the original timing signal to multiple subsequent devices. In the prior art, the output of such stratum 2 clocks are received by stratum 3 clocks which are installed in conjunction with various distributed devices within a data communications network. These stratum 2 clock output signals are also referred to as Building Integrated Timing Signal (BITS) clocks. The stratum 3 clock generates a timing signal, based upon the original stratum 1 clock signal, which is used locally with respect to the stratum 3 clock.

Several problems become apparent with the utilization of BITS clocks at each network device having a stratum 3 clock. Stratum 2 clocks are expensive, physical installation requirements can add to the overall cost of network installation, and the physical infrastructure required to distribute the BITS timing signal output to various stratum 3 clocks is potentially expensive and complex. Such high accuracy clocks also represent potentially expensive repair candidates. Thus, it would be beneficial to distribute timing signals within a data communications network as inputs to distributed stratum 3 clocks while minimizing the number of stratum 2 clocks and reliance upon respective BITS clock lines, and while enabling enhanced flexibility in terms of selecting timing signal sources and the distribution of such signals.

A further drawback to the usage of plural stratum 2 clocks in a data communications network lies in the outcome of a failure of one of the stratum 2 clocks. If such a failure occurs, the respective device or devices in the network are left without a centralized timing signal, and are left to rely upon a locally-generated timing signal source, which is free running with respect to the remainder of the network, or to a timing signal recovered from an incoming data stream.

Prior art data communications network devices such as switches have heretofore failed to provide system developers with adequate flexibility in terms of choosing from among plural timing signals. Typically, such a switch can employ an externally applied timing signal such as a BITS clock, a recovered clock signal derived from an incoming data stream, or a locally generated clock signal such as from a local oscillator. Flexibility in choosing from among these sources is very desirable to assure timing synchronization to a single clock and to enable cost savings.

Many prior art data networks also fail to provide redundant timing sources such that flexibility in choosing from among plural timing sources is enabled, in addition to the aforementioned flexibility in choosing the source of the common timing signal.

The prior art also suffers from deficiencies with specific reference to data communications network elements such as switches. Prior art switches have commonly employed asynchronous elements within the switch, thus requiring a significant degree of buffering, which is both expensive and tends to increase latency through the switch. Further, such asynchronous systems tend to have higher data loss characteristics, further reducing transfer rates through the necessity of retransmission.

Additionally, prior art switches have failed to provide "seamless" redundancy in internal timing reference sources such that no data is lost when it becomes necessary to switchover between redundant internal timing sources.

BRIEF SUMMARY OF THE INVENTION

A data communications switch and method of operation are presently disclosed which enable the highly flexible, selectable provision of a common timing signal for the purposes of synchronizing external communication through physical layer interfaces with other network devices, synchronizing internal data transfer through the network device to a timing signal source having a redundant backup, and enabling the uninterrupted synchronization of such external and internal communications. The switch according to a first embodiment of the present invention includes two timing modules (TMs), one being "active" while the other is "standby."

Synchronization of external communications in the presently disclosed network switch is provided through programmable selection from among plural potential sources of timing at the TMs. The active TM operates as a timing master, providing a primary synchronization clock to the system. The standby TM provides a redundant timing function, configured identically to the active TM. Both active and standby TMs have access to the same references, including two external references and two port references. This redundancy is necessary to avoid data loss due to a failure of a lone TM.

The selected timing source is used to synchronize a TM clock module which outputs a synchronization clock to each of plural base input/output (Base I/O or BIO) cards, which in turn distribute this timing signal through a backplane to a respective physical layer (PHY) card or cards. Each BIO and PHY card derive physical timing as appropriate for each transmission interface from this distributed timing signal. A state signal, generated by a system timing controller logic on each TM, indicates to the system which TM is active and consequently which synchronization clock is to be used.

Synchronized internal timing in the present invention is accomplished through the use of an internal clock associated with each clock module and a phase-locked loop (PLL) on each of the active and standby TMs. Which TM is to be used is controlled by a programmed microprocessor in a central control processor (CCP). The timing signal output of the clock and PLL on the active TM is routed to each BIO, CCP, and switch fabric (SF) via the backplane, thus providing a consistent source of timing for internal data transfer within the switch. By providing synchronous data transfer within the switch of the present invention, buffering of data communicated between the various switch elements is minimized, reducing system cost, reducing data transfer latency, and enabling alignment of data phase and frequency, which feature is employed when active elements of the switch are switched over for the respective standby element.

The active and standby TMs are interconnected. Both receive external timing inputs and are programmed to synchronize an internal clock with the selected timing input, both provide a synchronization clock for external communications, and both are actively generating clock signals for internal use. For internal timing, the timing signal outputs of the standby TM PLL are tri-stated since both the active and standby TMs drive the same point-to-point clock lines to the BIOs, the SFs, and the CCPs. The CCPs, SFs, and BIOs synchronize to the timing clock using respective PLLs. The synchronization of the active and standby TMs, and the synchronization of data transfer throughout the switch, enable seamless timing switchover should conditions warrant such a change in TMs.

BRIEF DESCRIPTION OF THE DRAWINGS

The invention will be more fully understood by reference to the following description in conjunction with the accompanying drawings of which:

FIG. 6 is a timing state diagram illustrating state transitions for the timing module of FIG. 5;

DETAILED DESCRIPTION OF THE INVENTION

The presently disclosed invention enables the provision of a common timing signal within a data communications network device such as a switch for the purposes of synchronizing external communication through physical layer interfaces with other network devices, synchronizing internal data transfer through the network device, and enabling the uninterrupted synchronization of such external and internal communications. The physical entities which enable these attributes in an exemplary switch are partially distributed among several elements, though the principal element is called a timing module 12.

Figure 1:
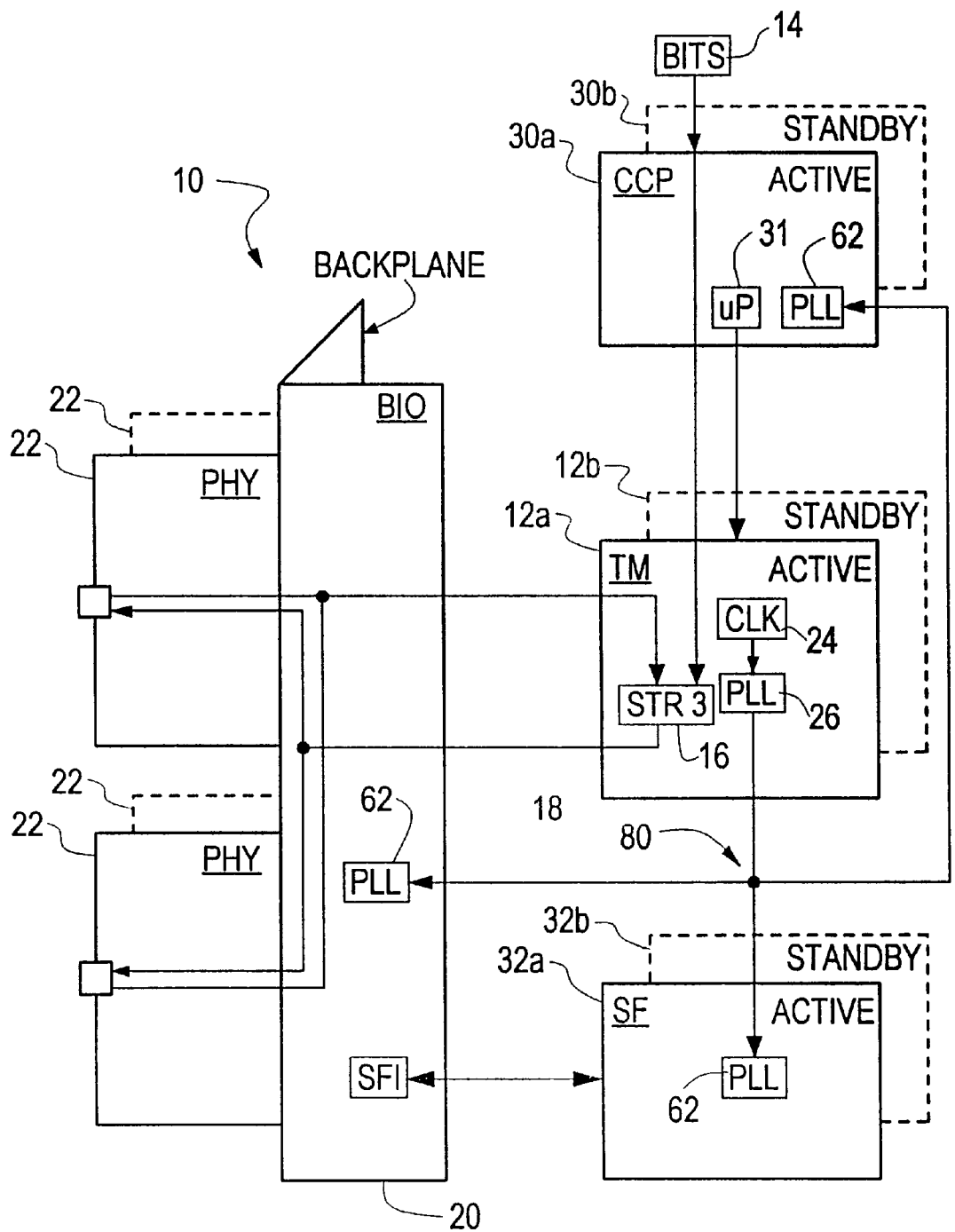
FIG. 1 is an overview of a first embodiment of network switch components which enable the presently claimed timing synchronization and switchover.

In FIG. 1, a data communication switch 10 according to a first embodiment of the present invention is illustrated. Two timing modules 12a, 12b, each labelled TM, are shown. As will be further described, one such TM 12a is "active" while the other 12b is "standby". The active TM 12a operates as a timing master, providing a primary synchronization clock (SYSCLK1) to the system. The standby TM 12b provides a redundant timing function, configured identically to the active TM 12a. Both active and standby TMs 12a, 12b have access to the same references, including two external references referred to as "primary" and "secondary", and two port references identified as "A" and "B" (see also FIG. 3). The SYSCLK1 and SYSCLK2 signals provide system timing redundancy on the backplane. This redundancy is necessary to avoid data loss due to a failure of a lone TM. TM_ONLINE_L signals, generated by system timing controller (SYSTC) logic 42 on each TM 12 (discussed subsequently), indicates to the BIOs 20, via the backplane 23, which TM 12a, 12b is active and consequently which synchronization clock is to be used. Each BIO 20 references the appropriate clock based upon the TM_ONLINE_L signal.

Synchronization of external communications in the presently disclosed network switch is provided through programmable selection from among plural potential sources of timing at the TMs 12a, 12b. The selected timing source is used to synchronize a stratum 3 (STR 3) clock module 16 which outputs the synchronized timing signal 18 (SYSCLK1 or SYSCLK2) to each of plural base input/output (Base I/O or BIO) cards 20, which in turn distribute this timing signal through a backplane 23 to a respective physical layer (PHY) card or cards 22 for controlling the timing of data transmissions to and from the PHY card(s) 22. Each BIO 20 and PHY card 22 derive physical timing as appropriate for each transmission interface from this distributed timing signal 18.

Synchronized internal timing in the present invention is accomplished through the use of an internal clock 24 and a phase-locked loop (PLL) 26 on each of the active and standby TMs 12a, 12b. Which one of the TMs 12a, 12b to be used is controlled by a programmed microprocessor 31 in an active central control processor (CCP) 30a. There is also a standby CCP 30b which is automatically enabled in case of failure of the previously active CCP 30a. The output of the clock 24 and PLL 26 on the active TM 12a is routed to each BIO 20, CCP 30, and switch fabric (SF) 32a, 32b, and standby TM 12b, thus providing a consistent source of timing for internal data transfer within the switch 10.

Figure 2:
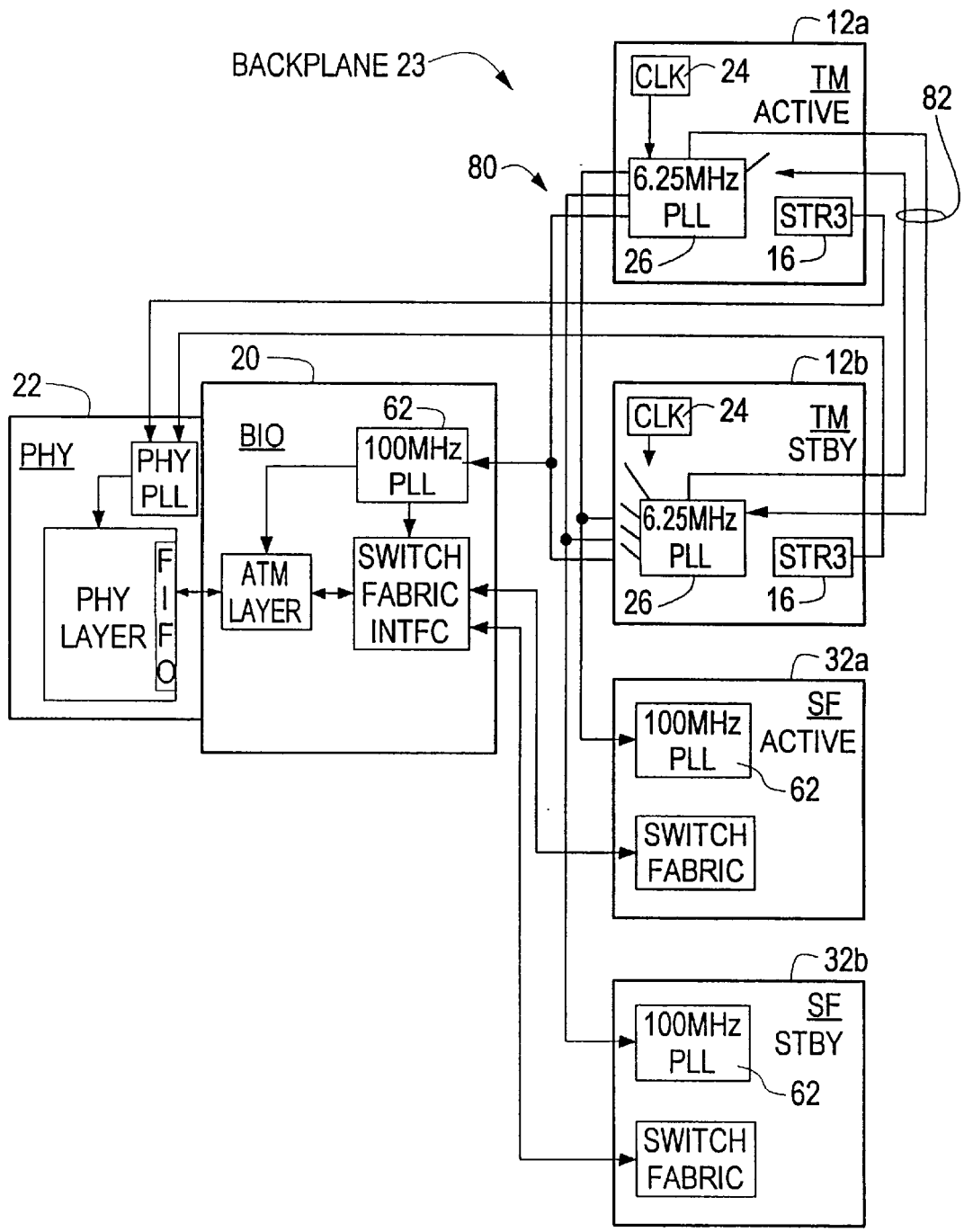
FIG. 2 illustrates the interconnection of timing modules and other network switch components enabling the presently claimed timing synchronization and switchover.

The active and standby TMs 12a, 12b are interconnected as shown in basic outline in FIG. 2. Both TMs 12a, 12b are "hot"; that is, both receive external timing inputs, both are programmed to synchronize the STR 3 clock 16 with the CCP-selected timing input, both provide a timing signal 18 for external communications, and both are actively generating clock signals for use internally with the switch fabrics 32a, 32b. However, as for internal timing, the outputs of the internal timing PLL 26 on the standby TM 12b are tri-stated since both the active and standby TMs 12a, 12b drive the same point to point clock lines to the BIOs 20, the SFs 32, and the CCPs 30. The CCPs, SFs, and BIOs synchronize respective PLLs 62 to the timing clock 24. The standby TM 12b also synchronizes the respective PLL 26 to the timing clock 24 of the active TM 12a. This enables seamless timing switchover between TMs 12a, 12b should conditions warrant.

Timing and synchronization standards requirements are found in Bellcore GR-1244-CORE, TA-NWT-01112, GR-253-CORE, ATM Forum B-ICI, and ANSI T1E1.2/94-002R1. In the most common usage, timing of an inbound SONET (synchronous optical network) frame is traceable to a PRS (primary reference source) or stratum 1 clock source per GR-1244, GR-253-CORE or ANSI T1.101. Therefore, to maintain synchronized timing throughout the network, it is necessary for the outbound bit stream to also be traceable to a PRS. The presently disclosed switch enables programmable selection of PRS timing sources including BITS (building integrated timing source) inputs E1 (1.544 MHz) or T1 (2.048 MHz), as appropriate, or recovered from inbound communications as above. Further, the presently disclosed TMs have holdover and free-run modes, in which an internal clock associated with the STR 3 clock module 16 is utilized with outputs within +/−4.6 ppm of the nominal rate (in a first embodiment) to maintain acceptable synchronization. The TMs 12 are capable of providing an indication to the CCPs 30 that such states (not synchronized) are active.

External Timing Synchronization

Figure 3:
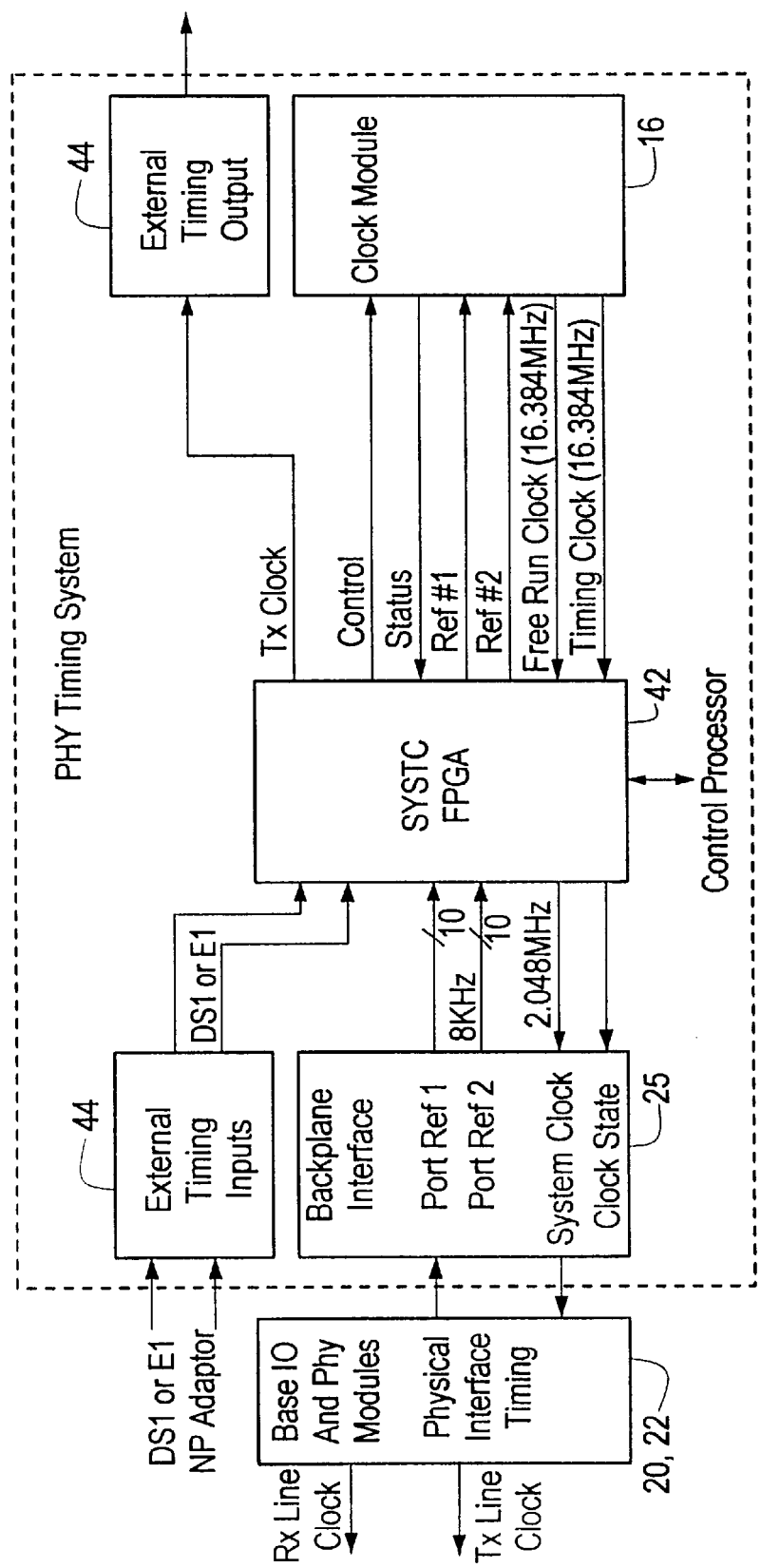
FIG. 3 provides a block diagram of elements enabling physical layer card synchronization.

With reference to FIG. 3, the PHY timing functional partitioning is illustrated. The clock module 16 performs the functions of stratum 3 holdover, free-run clock, and timing synchronization via an internal PLL and high-precision (+/−4.6 ppm) oscillator (not shown). In a first mode, the module can select from two external references and lock timing. Alternatively, holdover can be invoked from the last known good reference data point when an external reference fails; a five minute timing history is maintained by the digital PLL. The timing modes (external reference, free-run, holdover) are fully software selectable. Alarms for PLL lock, tuning range limit, holdover, and free-run mode are provided. All alarms and control are provided by the SYSTC logic 42. The clock module 16 requires 8 KHz references, which are divided down by synchronous dividers (implemented in the SYSTC logic 42) on the respective TM 12, and supplies a 16.384 MHz output PLL clock (SYSCLK1 or SYSCLK2) and a 16.384 MHz free-running clock.

An external clock (input) source is selectively used as the timing reference for the system. As recommended and/or required by standards (e.g. Bellcore GR-1244), two sources of external timing are provided, a primary and a secondary. The primary and secondary external sources are both distributed to the active and standby TMs 12a, 12b. The clock signal can be selected as the reference for deriving the synchronization clock (SYSCLK1 and SYSCLK2) for the external (system) communications. The active TM 12a recovers the clock and provides a digital signal, via a CCP input/output adapter (CCP I/O adapter—see FIG. 4) 40 to the standby TM 12b. This enables the same synchronization clock to be used by both the active and standby TMs 12a, 12b.

Figure 4:
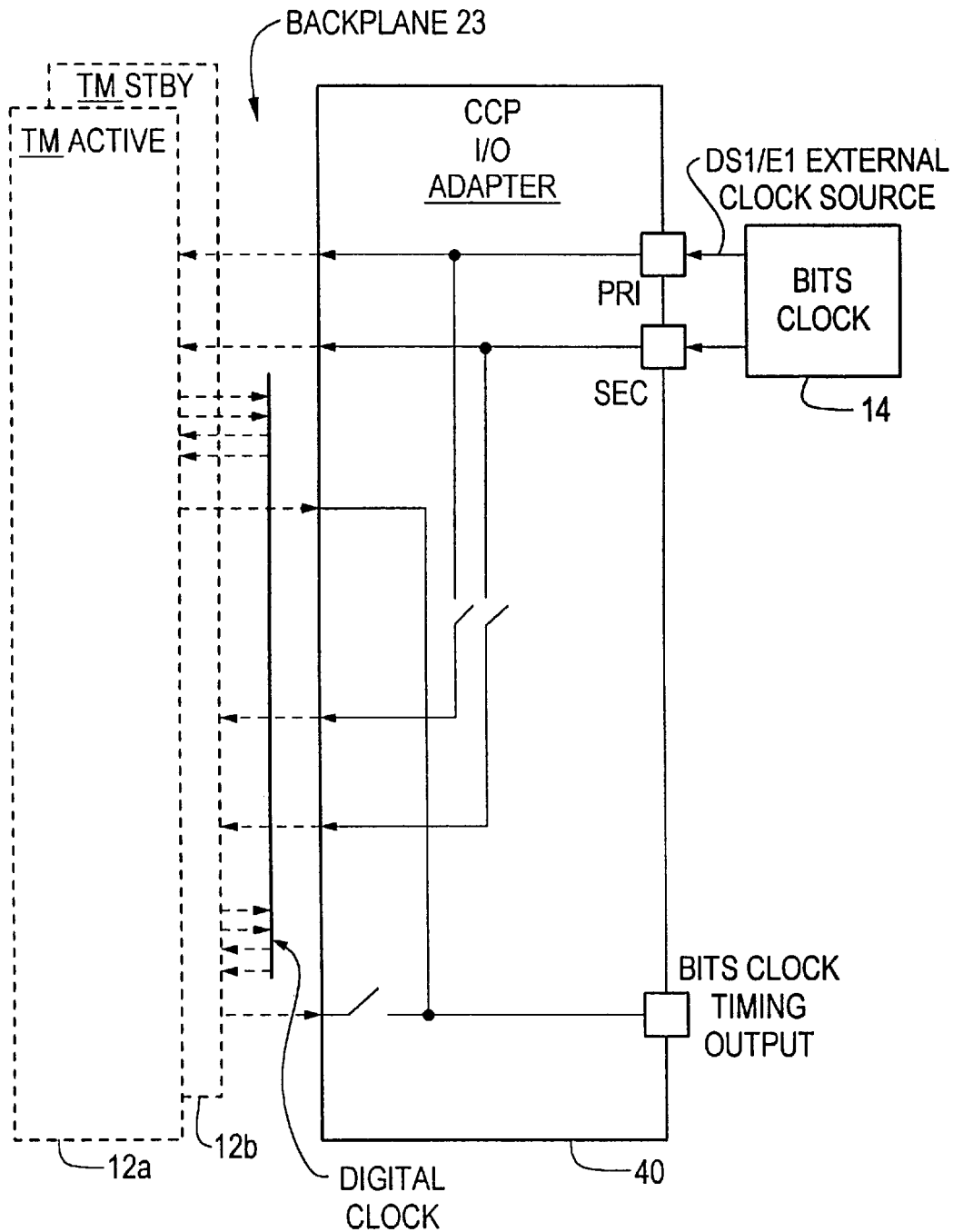
FIG. 4 illustrates the distribution of timing signals through a network processor input/output adapter (CCP IOA)

With reference to FIG. 4, a building integrated timing supply or BITS clock 14 provides a primary and secondary reference source to the CCP I/O adapter 40. The adapter 40 enables the provision of these external references to the active and standby TMs 12a, 12b. The BITS clock may be, for instance, the output of a stratum 2 clock module.

Figure 5:
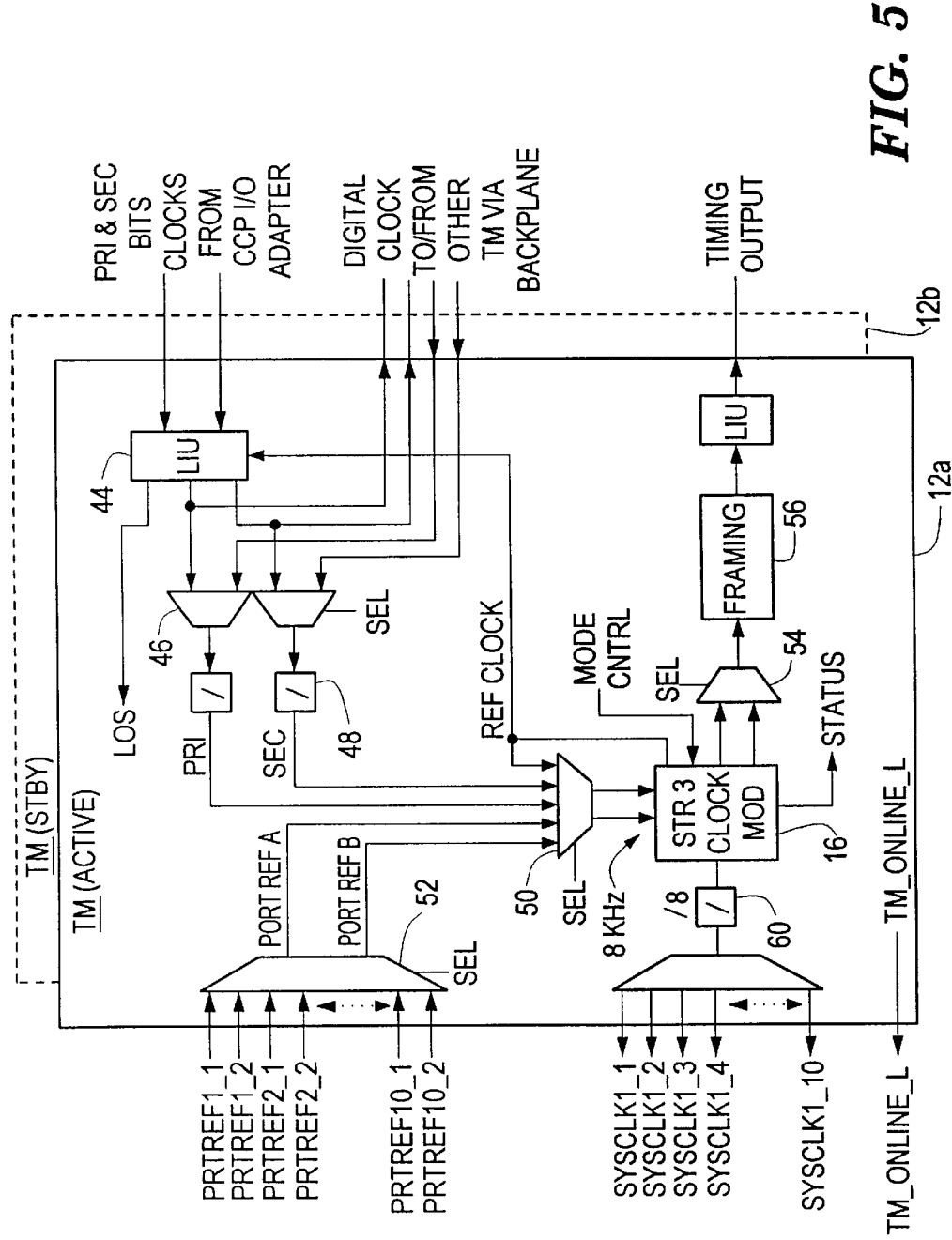
FIG. 5 illustrate portions of a timing module which enable physical layer card synchronization.

With reference to FIG. 5, the external reference is captured by a line interface unit (LIU) 44 which provides a digitized version of the external reference. The standby TM 12b is synchronized to the digital timing signal output from the LIU 44 of the active TM 12a rather than to the external references. The selection of the digital timing signal versus the external reference is enabled by a 2:1 mux 46. The LIU 44 also provides various error checking functions.

The LIU 44 on each TM 12a, 12b accommodates either DS1 (T1) or E1; the default external source rate in the first embodiment is 1.544 MHz for DS1. Wire-wrap connections support DS1 inputs. E1 inputs on the CCP I/O adapter are 75 ohm BNC. The input circuitry 44 also monitors for an alarm indication signal (AIS) (unframed all ones) and loss of signal (LOS) signals. The LIU 44 performs clock recovery and jitter attenuation on the external timing signals; a reference clock signal from the clock module 16 is required by the LIU 44 to perform the jitter attenuation. An LOS indication is provided for each reference source and is provided to the SYSTC 42. Such an error is indicated in a first embodiment when 175 consecutive spaces are detected on the incoming signal. The clock module 16 internal clock is utilized under this condition. Relays on the CCP I/O adapter 40, under the control of the active TM 12a, route the external references (primary and secondary) to the active TM 12a, and route digitized versions of the same clocks, from the active TM 12a LIU 44, to the standby TM 12b LIU 44. The I/O adapter supports both DS1 and E1; software, via the SYSTC logic 42, determines which rate to expect.

One timing output (DS1 or E1) from the LIU 44 to the CCP I/O adapter 40 is also provided. For DS1, the signal is framed all-ones in the Superframe (D4) format, with the capability of inserting DS1 AIS when the reference is lost or degraded. E1 mode timing output will support G.704 framing (TS16 and CRC not supported), and G.703 section 6 electrical interface requirements. The conductor/cable type in a first embodiment is a twisted pair (100 ohm balanced) using wire wrap terminals for DS1; E1 sources support BNC (75 ohm for 2.048 MHz).

The SYSTC 42 performs control functions for the clock module 16 and LIU 44. In the drawings, the LIU is also labelled "External Timing Inputs" and "External Timing Output" in FIG. 3 based upon its various functions. Control and status registers within the SYSTC logic 42 allow configuration of the LIU 44 and monitor for timing alarms. SYSTC 42 functions perform revertive/non-revertive operations, reference selection, and clock dividers. System clocks are monitored and distributed by the SYSTC 42 to the clock module 16 and backplane 23.

The recovered external reference is next divided down by a divider 48 (divide-by-193 for DS1 or divide-by-256 for E1, implemented in the SYSTC logic 42) such that a subsequent 5:2 mux 50 receives two 8 KHz signals (port references from the backplane are normally at 8 KHz already). The same 5:2 mux 50 also receives port reference signals at 8 KHz, the port reference signals having been chosen, at a 20:2 mux 52, from among all recovered clocks originating from the interconnected BIOs 20.

Figure 7:
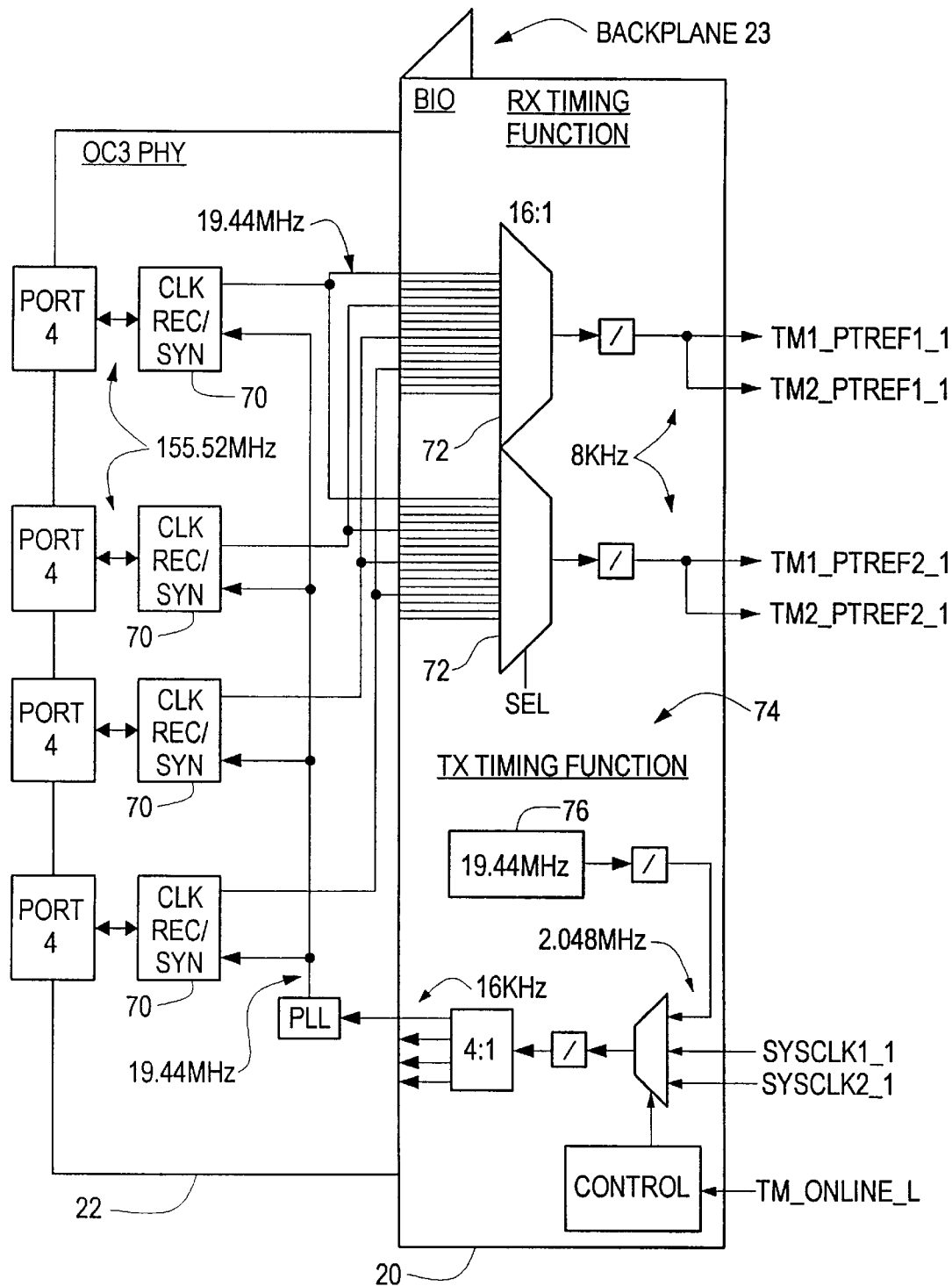
FIG. 7 illustrates the transfer of timing signals through a base input/output (BIO) element and an associated physical layer card for physical layer card synchronization.

Port references are timing signals which are derived from data inputs to PHY cards 22 (FIG. 7). For instance, an OC3c/STM1 (optical carrier level 3/synchronous transport module—level 1) PHY card 22 is a physical layer card that provides a SONET/SDH (synchronous optical network/synchronous digital hierarchy) ATM (asynchronous transfer mode) interface to a respective BIO 20. In general, the PHY module provides physical media dependent (PMD) and transmission convergence (TC) sublayer functionality prior to the ATM layer processing performed by the BIO 20. Up to four such OC3 PHY cards 22 can be connected to a BIO 20. Similarly, up to four OC12 PHY cards can be connected to a single BIO 20. However, each BIO 20 can only accommodate a single OC48 PHY card. Each PHY card 22 contains the optics, framing, and timing generation functions unique to the physical level intended to be supported. Control for all PHY cards 22 interfacing to a BIO 20 is provided by the respective BIO 20 through a PHY interface disposed thereon (not shown).

Figure 8A:
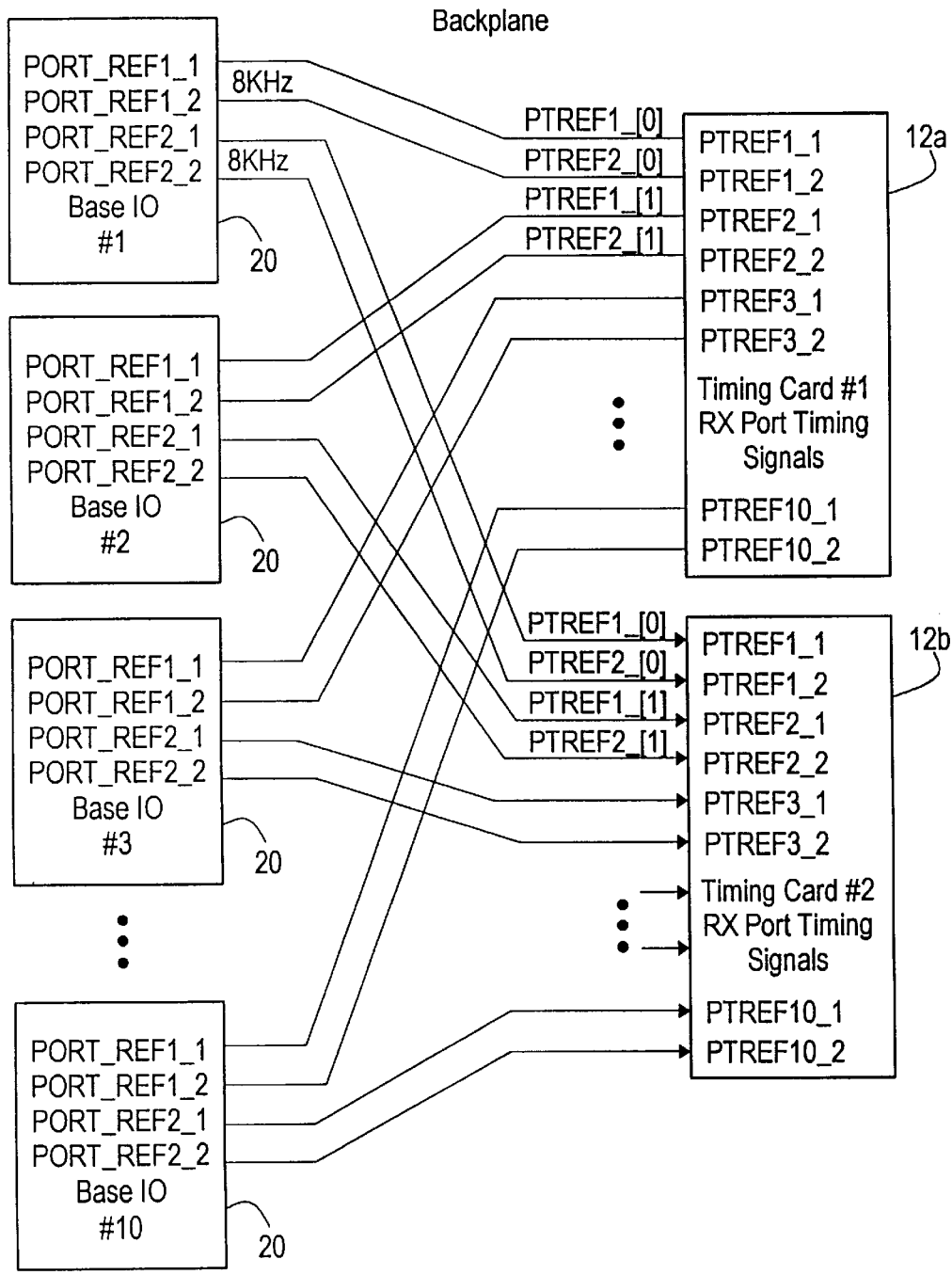
FIG. 8A illustrates the distribution of recovered timing signals from plural BIO elements to active and standby timing modules.

Any port on a PHY card can be selected as a timing source for the system. Each port has associated therewith a clock/recovery synthesis unit 70, which in part recovers a port reference clock. The recovered port clocks for each port are routed through the switch backplane 23 to a respective BIO 20. If the BIO 20 is interfaced to OC3 or OC12 cards 22, the BIO receives up to sixteen port clocks (four ports per PHY card, four PHY cards per BIO). The BIO 20 provides two 16:1 muxes 72 for the purpose of generating two port reference signals per BIO 20. Each of these two port references is routed to both active and standby TMs 12a, 12b. Thus, there being a maximum of ten BIOs in a first embodiment, each of the TMs 20 receives twenty port references (see FIGS. 5 and 8A). The 20:2 mux 52, implemented in the SYSTC logic 42, is utilized to select two port references for routing to a 5:2 mux 50, also receiving the two external references, at the input to the clock module 16.

The 5:2 mux 50 provides a primary and a secondary reference to the clock module 16 for eventual distribution throughout the system as the primary synchronization clock. A secondary synchronization clock is provided by the standby TM 12b and is derived from the same primary reference as that used by the active TM 12a, and is also distributed throughout the system. Thus, two identical clock units (STR 3) are used, each locked to designated primary or secondary references, and each distributing the primary and secondary synchronization clocks for the system.

Figure 8B:
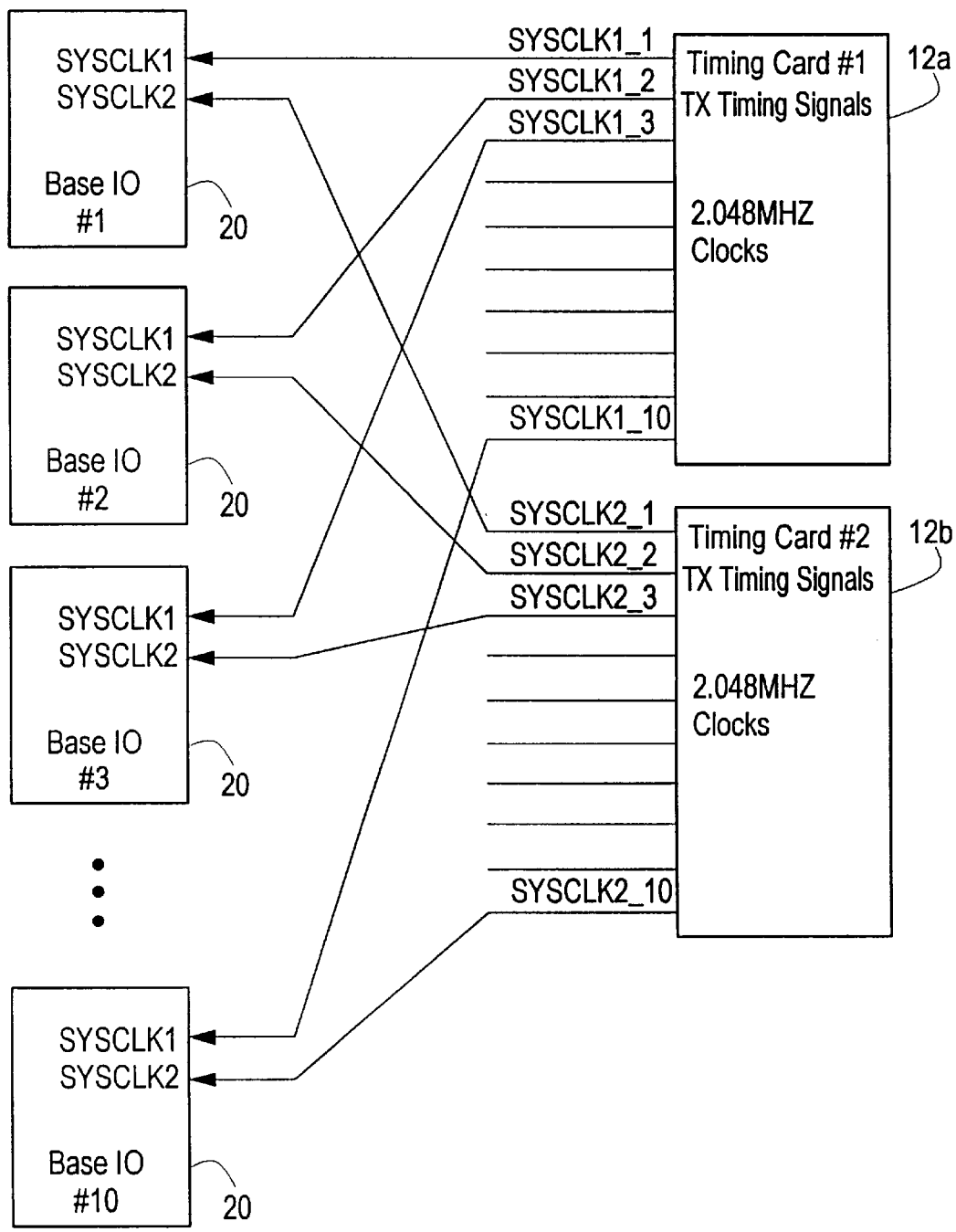
FIG. 8B illustrates the distribution of synchronization signals from the active and standby timing modules to plural BIO elements.

The clock module 16 uses the designated reference, external or port, as the timing reference for the internal PLL (not shown), and provides a 16.384 MHz synchronization clock (SYSCLK1 or SYSCLK2) output. The synchronization clock is divided down to 2.048 MHz by the SYSTC 42 and output to the backplane 23 via a backplane interface 25. The backplane interface 25 provides drivers for the clock state, TM state, TM_ONLINE_L, and SYSCLK1 or SYSCLK2 signals. There being up to ten BIOs 20 in a first embodiment of the present invention, the backplane interface 25 provides a 1:10 demux of a single SYSCLK1 or SYSCLK2 signal into ten such signals, each for point-to-point distribution to a respective BIO 20 (see FIG. 8B).

As previously mentioned, each BIO 20 receives the SYSCLK 18 signals in addition to a TM_ONLINE_L signal (FIGS. 3, 5, 7 and 10) from the TMs 12a, 12b. The synchronization clocks are received in the BIO 20 by a BIO PHY Timing Controller (PTMCTL) logic circuit, generally referred to as element 74 in FIG. 7. The PTMCTL 74 selects the appropriate clock based upon the TM_ONLINE_L signal. If the TM_ONLINE_L is low, this indicates that the associated clocks from the TM 12 in the first card slot is preferred or active; a logic high indicates that the other TM 12 in the second slot is the preferred clock. Switchover of the reference clock occurs either in response to software or hardware upon detecting a loss of clock on the previously indicated line, or upon lock failure. The BIO-detected conditions are reported as software alarms. The BIO receives the TM_ONLINE_L signal and selects the "primary" clock signal accordingly when presented with redundant clocks. A TM 12 designated "active" by the TM_ONLINE_L clock state signal may nonetheless be rejected as the source of PHY timing due to a timing error in the "active" synchronization clock; an active TM 12a with timing errors will switch the clock state.

The PTMCTL 74 enables four transmit timing modes. In Loop Timing, the transmit timing for a port is derived directly from the recovered clock for that port. This mode is supported on a per port basis only. In Recovered Timing, the transmit timing is based upon the "recovered" synchronization clock received from one of the TMs 12a, 12b.

All ports are synchronized to the same reference when this mode is utilized. In External Timing mode, the transmit clock is based upon the "external" synchronization clock received from one of the TMs 12a, 12b. Once again, all ports are synchronized to the same reference when this mode is utilized. Lastly, in the Local Timing mode, the transmit timing is derived from a stable (+/−20 ppm) clock source 76 for an internal free-running mode. This option provides a temporary reference source when there is no reference or the selected reference is lost. The internal clock is disposed on the BIO 20. All ports are synchronized to the same reference when this mode is utilized.

The PTMCTL 74 provides the control function of the PHY module, and enables a synchronized timing signal to each of the output ports associated with each PHY card 22 interfaced to the BIO 20. The frequency values illustrated in FIG. 7 are for an OC3 PHY card. Other values are associated with different speed PHY cards.

Mode control is issued by the SYSTC 42 to the clock module 16. Mode control is also used internal to the SYSTC logic 42 to select proper internal operation (e.g. set divide ratios), and is set by software. The clock module 16 monitors the synchronization clock and reference for lock tuning limit (LOCK) and PLL tuning limit, and returns status information to the SYSTC 42.

In a first embodiment of the present invention, all control to the STR 3 clock module 16 is provided by the SYSTC logic 42 on the respective TM 12. Two control lines from the SYSTC logic 42, CNTRL A and CNTRL B (not shown), define the operation of the clock module 16 in one of four modes: free-run; external reference #1; external reference #2; and holdover.

With reference to FIG. 6, if a synchronization error condition exists (e.g. AIS, LOS, LOCK), the SYSTC 42 detects the alarm condition and notifies the clock module 16 to switch to its secondary reference input (path 2). If the secondary reference is in a "fail" state, or fails sometime later, the clock module 16 enters a holdover mode of operation (path 3) provided the "holdover" value has not been corrupted by erroneous signals. If unable to enter holdover, the clock module 16 (and system) enters a free-run mode according to a stratum 3 source internal to the clock module 16 (path 6). Revertive and non-revertive operations are supported for switching back to preferred references. The clock module 16 state is monitored by the SYSTC 42 for holdover and free-run conditions.

The timing states shown in FIG. 6 relate operational transitions due to the synchronization references (external and port). Control of the timing states is revertive (automatic) in a first embodiment, manually performed via software, or due to error conditions. A timing reference is considered failed or unsuitable under the following conditions:

LOS on active external synchronization reference. The LOS is monitored on the port BIOs for port references, and in the SYSTC 42 hardware for external references. References transported on the backplane 23 will be monitored for loss of reference by monitoring the clock edges. For port references, an AIS, LOF, and LOP detected on the incoming signal causes a switchover of the references. Since these errors are detected on the BIOs 20, software must communicate to the CCP 30 and initiate the switchover.

Line AIS on active synchronization reference (i.e. recognize the unframed all-ones AIS). Line degradation may also be used to declare a reference failed. For external references on the CCP input/output adapter 40, AIS will be monitored. AIS is monitored, where applicable, on port BIOs and communicated to the SYSTC 42 via software.

For port references, LOF and LOP detected on the incoming signal also cause a switchover between TMs. Since these errors are detected on the BIOs by alarm processing and performance monitoring, software must communicate to the CCP 30 and initiate the switchover. OOF (Out of Frame) is also monitored on the external timing inputs.

Hardware monitors for Lock Detect and Tune-Limit Range signals, the ability of the digital PLL in the SYSTC 42 to lock to references and clocks. The inability of a PLL to lock (or maintain lock), indicated by the Lock Alarm and/or Tune-Limit, and to provide these synchronization signals, shall initiate a switch to the backup reference (provided it is acceptable).

For the above, "acceptable" is defined as having no errors (e.g. LOS, LOR, LOCK, AIS, Tune Limit) present on a selected reference.

At startup, the timing module 12 will default to the local free running oscillator in the STR 3 clock module 16 (the Free-Run/Init state). If port references are to be used, they are selected first on the BIOs 20 prior to use as the control reference to the TM PLL in the clock module 16. Interrupts are masked during setup.

The "Primary" state shown in FIG. 6 is entered after the TM PLL obtains lock on a selected, error-free reference. If "Primary" fails, by detection of any of the switch state conditions of LOS, AIS, LOR, Lock Error, or IOM port error detection, a switchover to "Secondary" results, provided the secondary reference is without error. If the secondary is not available, the PLL transitions to the "Holdover" state.

The timing remains in "Secondary" until "Primary" recovers (revertive mode), is manually switched, or until the secondary reference fails and the primary reference is available. The time period for switching back (in a revertive operation) to the desired clock is from 10<T<30 seconds after the fault condition has cleared. If the "Primary" state is unavailable, the "Holdover" state is entered using the last known good reference.

The "Holdover" state is entered when the desired references (i.e. the primary and secondary references) are in error. The TM PLL in the clock module 16 will remain in the "Holdover" state until a reference has been error free from 10<T<30 seconds. After this time, the state transitions to the highest "good" state.

The "Free-Run" state is entered by either default, by error in holdover, or by active configuration. The TM PLL will remain in "Free-Run" until a reference has been error free from 10<T<30 seconds. After this time, the state transitions to the highest "good" state. "Free-Run" and "Holdover" are both considered "error" states.

Software can manually change the state of operation at any given time by changing the configuration register inputs to the SYSTC 42. Automatic or revertive switches only occur upon the detection of an alarm/switching condition. In the first embodiment, once initialized, any changes of state are attributed to an error condition. Switching to a backup source is always automatic during an error state. Restoration once the error is removed can be either be automatic or manual. The internal states of the TM function are observable by status registers.

Each state change results in a maskable interrupt to the CCP 30. Alarms originate in both hardware and software; changes of mode are reported in software. Minor alarms indicate a loss of a single reference or reference degradation. Major alarms represent a loss of both references or that both references are degraded. Degradation of the port references is monitored and processed on the BIOs 20 and indicated via software. Losses of external and backplane reference signals are monitored in the TM 12 and provided to software. PLL alarms detected in TM hardware caused by the failure of the PLL to lock to a given reference, or by Tune-Limit alarms, are considered minor alarms.

The clock module 16 provides two outputs which may be used as external timing outputs. The first is a free-run clock which has a transmit-in-error pattern inserted in it. This clock is derived from a local clock in the clock module 16 used for diagnostics in the absence of external references, or when the external references and the port references are unreliable. The second is the 16.384 MHz system clock output. A 2:1 mux 54 is used to select between the two (see FIG. 5). Framing is provided, for DS1, to frame the signal as all-ones in the Superframe (D4) format, with the capability of inserting DS1 AIS when the reference is lost or degraded. For E1 mode, framing support for G.704 (TS16 and CRC not supported) is provided. Subsequently, the LIU 44 provides an interface for the external timing signal to the CCP I/O adapter 40. This external timing output provides a reference to the timing system and can be used as one of the two external reference inputs to a subsequent switch, which need not be of the same type as presently disclosed.

Internal Timing Synchronization

The internal timing synchronization, also referred to as switch fabric (SF) timing synchronization, involves the provision of a redundant, centralized timing signal driving PLLs 62 distributed throughout various elements in the presently disclosed switch 10. The internal synchronization clock signals 80 are based upon a single SFCLK, so-referred due to its use in synchronizing the switch fabrics 32a, 32b. SFCLK is distributed as multiple point-to-point 6.25 MHz clocks to each BIO 20, SF 32, and CCP 30 (see FIGS. 1, 2 and 9). The active TM 12a drives the SFCLK. The standby TM 12b is frequency locked, via a 6.25 MHz PLL 26 to the active TM 12a (see timing path 82 in FIGS. 9 and 10), thus making the standby TM 12b available in case of TM switchover. CCP 30 control over the TMs 12a, 12b is seamless in case of switchover (discussed below). Handshaking signals between the active and standby TMs facilitate the switchover functions in a controlled manner.

To reiterate, the SFCLK enables the internal synchronization to a single clock for all data interfaces (except PHY cards) exchanging data across the backplane 23 in the switch. The active TM 12a distributes the SFCLK, running at 6.25 MHz, to synchronize traffic to and from the transport layer (e.g. an ATM layer having a Utopia Level 2 interface to PHY) through the system switch fabric; any transport layer protocol can be synchronized to. In an exemplary embodiment, the loop bandwidth of the system PLLs 62 are 200 Hz for the 100 MHz PLLs 62 on the BIOs 20, CCPs 30, and SFs 32, and 10 Hz for the 6.25 MHz PLLs 62 on the TMs 12. The local clocks for SF timing are +/−25 ppm for frequency accuracy at 6.25 MHz and synchronize the local 100 MHz differential clocks. The reference clock is selected at 6.25 MHz to simplify the logic design of the 100 MHz loop feedback path (i.e. divide by 16), though alternative speeds are employable.

Figure 9:
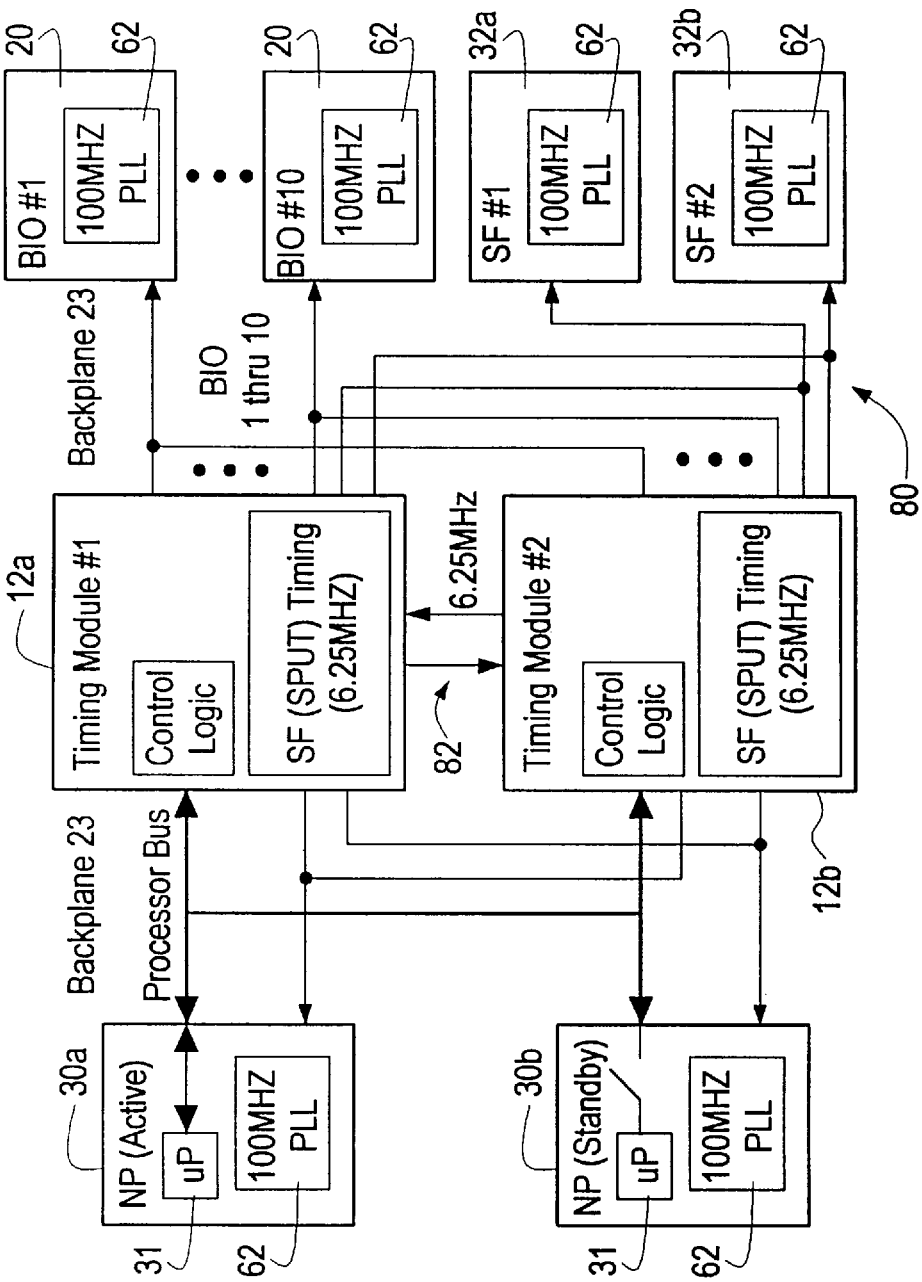
FIG. 9 illustrates a general view of switch fabric timing synchronization as presently disclosed.
Figure 10:
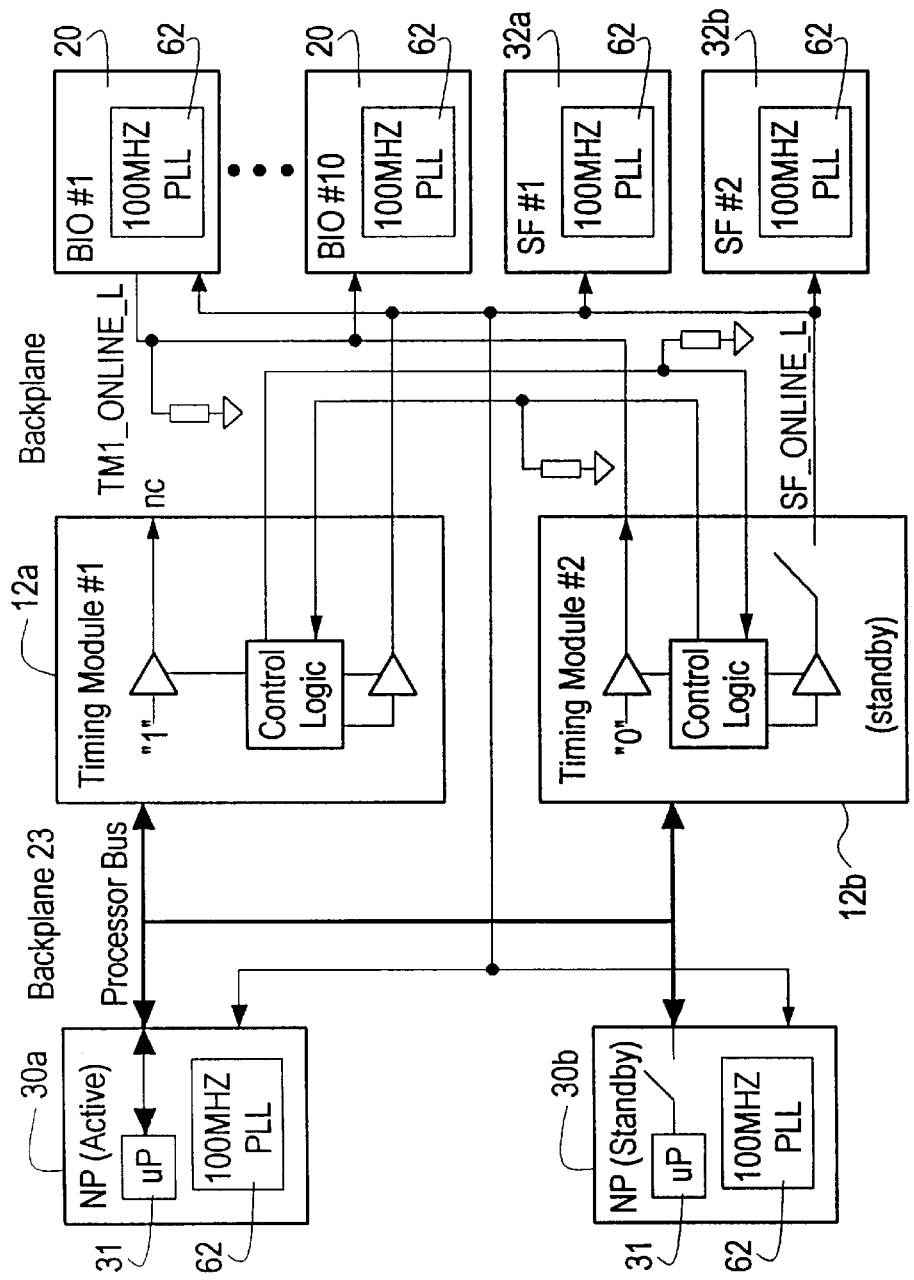
FIG. 10 further illustrates the switch fabric timing synchronization of FIG. 9.
Figure 11:
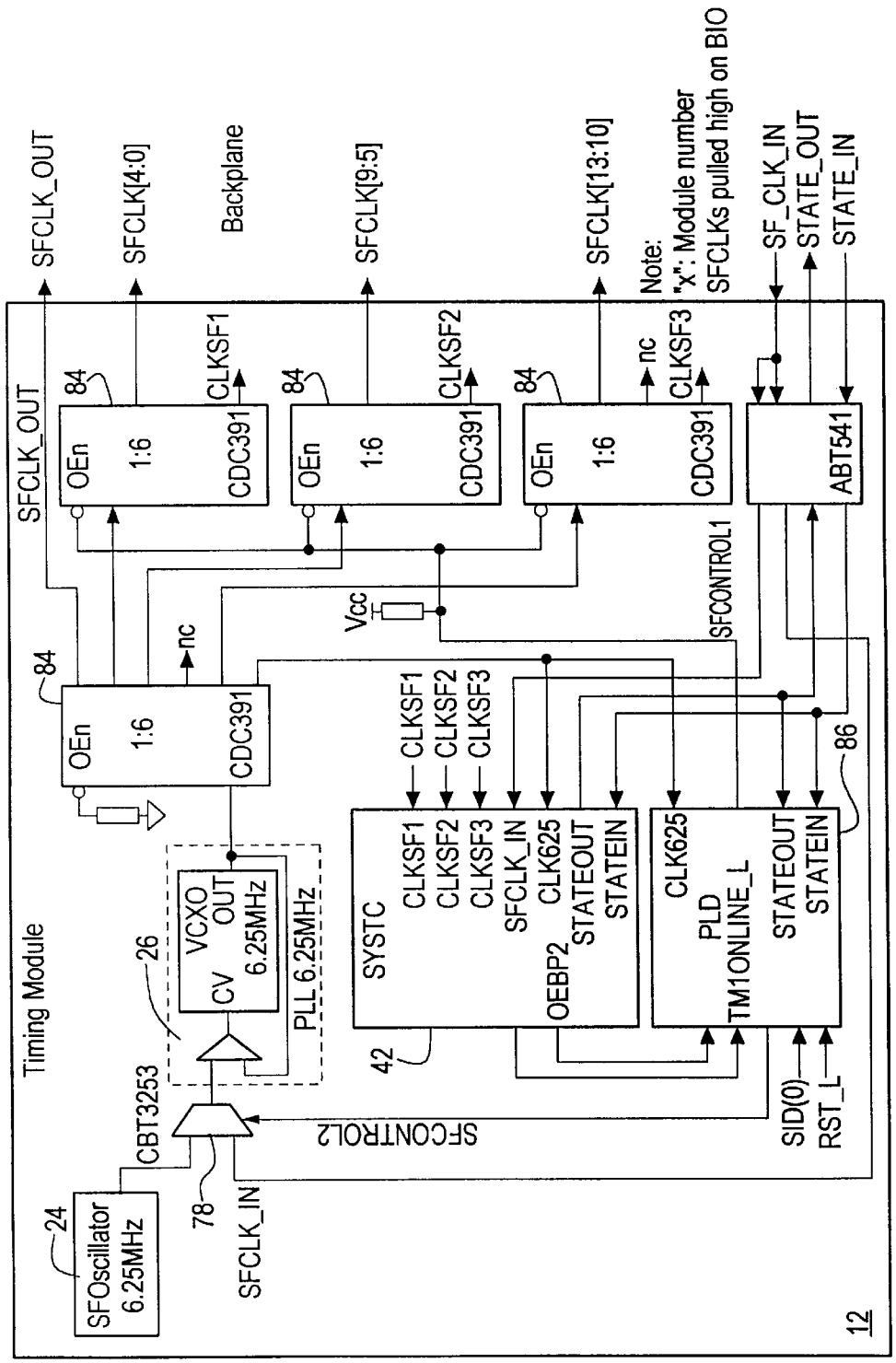
FIG. 11 provides a detailed schematic of timing module elements and signals involved in switch fabric timing synchronization.

In the TMs 12a, 12b (see FIG. 11), the 6.25 MHz oscillator 24 is a 5.0 volt SMT (surface mount technology) package with a +/−25 ppm stability. Bus drivers 84 which drive the SFCLK signals of FIG. 9 are clock drivers with tri-state outputs (see open outputs at PLL 26 of the standby TM 12b in FIG. 2). All clocks are series terminated at the outputs of the drivers and pulled high on the receivers. The SYSTC 42 monitors clocks from the drivers and the oscillator for activity, and provides control of the drivers.

With reference again to FIG. 11, the SFCLKs are generated by an on-board PLL 26 running at 6.25 MHz. The PLL 26, via a clock selector 78, use either the local 6.25 MHz oscillator clock 24 or a clock signal from the other TM 12. If the present TM 12 is active, the local 6.25 MHz clock is used and an output clock is provided to the standby TM 12b (SF_CLK_OUT). The standby TM 12b uses the cross-connected clock from the output of the PLL 26 of the active TM 12a (SF_CLK_IN). Only the active TM drives the SFCLKs 80 on the backplane.

Timing Module Switchover

A programmable logic device (PLD) 86 and SYSTC logic 42 decide the active versus standby state for the TMs 12. The "STATE_IN" and "STATE_OUT" signals (FIG. 11) are the cross-connected states of the TMs 12a, 12b. STATE_OUT is the local state output to the other TM 12. STATE_IN is the input state of the other TM 12. A logic high indicates off-line (standby or error state). If the logic is not downloaded on either TM 12a, 12b, the slot ID is used to force a TM card to be active; in an exemplary embodiment, the TM card in the first slot of a switch card cage is designated "active." This allows, at a minimum, for the SF clocks, and thus the backplane 23, to be operational. In a preferred embodiment, however, software selects which TM 12 is to be active upon configuration.

Hardware failures on the active TM 12a cause the STATE_OUT signal to change to a logic high state. The standby TM 12b detects this change in state and becomes active. The active CCP 30a monitors state changes by either polling status from the TMs 12 or by monitoring interrupts, and on detection, reconfigures the TM to match the hardware operational state. If there is no standby TM 12b installed in the switch card cage, as detected by a clock activity monitor on the cross-coupled clocks, then all switchovers are prohibited. To generalize, the SYSTC 42 decides on the state of "itself" and the "other" TM 12, and monitors for failures and reconfigurations. The PLD 86 uses this information to select the PLL clock input 24 and control the backplane interface.

TM resets are delayed by the PLD 86 for four 6.25 MHz clock cycles prior to resetting the module, in a first embodiment. The PLD 86 monitors for changes in the reset request lines and indicates the status to the SYSTC 42. The SYSTC 42 initiates a normal switchover in the time period prior to board level reset. The conditions for switchover include: reset; software initiated (for instance, to reconfigure); loss of clock activity on output drivers; and loss of clock activity from the other TM. Faults detected in the system (i.e. lock error on a BIO 20), are reported to the active CCP 30a through the system software to initiate a software switchover.

Only the active TM 12a is allowed to drive the SFCLKs on the backplane. Upon fault detection or switchover on the present active TM 12a, the PLD 86 disables (tri-states) the SFCLKs on the rising edge of the clock; the system cards (i.e. BIO, SF, CCP) have pull-up resistors to maintain a logic high on the signal during switchover. Concurrently, the "faulting active" TM card indicates a state change to the standby TM, and begins to use the "other" TM's cross-connected clock for its PLL 26 via the clock selector 78.

After a gap of one to two clock cycles, the standby card 12b becomes active and enables its clock drivers, and switches PLL references to use the local 6.25 MHz clock 24 (rather than the cross-connected clock).

During a timing switchover, the TMs TM1 and TM2 behave as follows for errorless switchover (assuming TM1 is initially the active source):

TM1: Active → Transition → Standby

TM2: Standby → Transition → Active

"Active" is defined as the source of SF timing, using the 6.25 MHz clock 24 to drive data communications across the backplane 23. "Standby" uses the source from the other, "active" TM 12a, via cross-connected clocks, to synchronize the local PLL 26 and does not drive the system. "Transitional" state refers to the period when neither TM is active.

During switchover, TM1 (originally, the active TM 12a) initiates rearrangement. On a rising edge of the SFCLK at 6.25 MHz, TM1 disables the SFCLK drivers 84 to the backplane 23 and switches the PLL 26 reference to use the "other" TM's clock output, thus entering the "transitional" state. TM2 detects a change of state in TM1 on the next cycle of the synchronized PLL 26. On the following clock cycle (rising edge), TM2 enables the backplane drivers 84 and switches over to its local clock 24. The SFCLKS are pulled high on the respective cards during this transition period to assure no "extra" clock edges into the respective PLLs 62. It is necessary that all loops distributed throughout the system track the change in input timing reference similarly, hence the need for the transitional state.

During the "transitional" state, the PLLs 26 on the TMs 12 are referenced to each other in a timing loop for one clock cycle. The distributed PLLs 62 have slow response times, so this gap is acceptable. The total gapping of the system clocks is no greater than two clock cycles during switchover.

The foregoing disclosure recites specific hardware elements and operational frequencies. However, it will be understood by one skilled in the art that the concept of the invention should not be limited to that disclosed, nor to the enabling technology available at the time of the filing of the present application. Rather, any future technology which facilitates the external synchronization of a network device such as a switch to other such network elements, the internal synchronization of data communication within such a network element, and the seamless switchover of timing modules used to implement the external and internal synchronization, all according to the present invention, is considered to be encompassed by the present disclosure.

Specifically, the presently disclosed network switch is intended for use in an ATM network, and is shown as providing an interface between optical data channels to such a network. However, the concepts of the present disclosure are also applicable to other types of networks and communications media. Furthermore, while the present disclosure illustrates redundant timing modules interfaced to redundant central control processors and redundant switch fabrics, the concept of the invention is equally applicable to a switch not having such redundant central control processors and switch fabrics.

These and other examples of the invention illustrated above are intended by way of example and the actual scope of the invention is to be limited solely by the scope and spirit of the following claims.

What is claimed is:

1. A network switch for providing uninterrupted synchronous timing among each of plural modules within said network switch, comprising:

first and second timing modules, each having a local clock generator for generating an output clock signal and a phase locked loop for the generation of a respective timing signal based upon said output clock signal; and a phase locked loop for each of said plural modules in said network switch, said plural modules enabling the switching of data through said network switch in synchronization with one of said timing signals, said network switch having a first configuration wherein said local clock generator of said first timing module is for providing said phase locked loop of said first timing module with said output clock signal for generation of said respective timing signal, said phase locked loop of said first timing module for providing said respective timing signal to said phase locked loop of each of said plural modules, and to said phase locked loop of said second timing module for the generation of said respective timing signal, said timing signal of said phase locked loop of said second timing module being unused by said phase locked loop of each of said plural modules when said first timing module-generated timing signal is used by said plural modules, said network switch having a second configuration wherein said local clock generator of said second timing module is for providing said phase locked loop of said second timing module with said output clock signal for generation of said respective timing signal, said phase locked loop of said second timing module for providing said respective timing signal to said phase locked loop of each of said plural modules, and to said phase locked loop of said first timing module for the generation of said respective timing signal, said timing signal of said phase locked loop of said first timing module being unused by said phase locked loops of each of said plural modules when said second timing module-generated timing signal is used by said plural modules.

2. A method of providing an internal timing signal to plural modules within a network switch for synchronizing data transfer within said switch, said switch comprising first and second timing modules, said method comprising the steps of:

generating a clock signal by a first local oscillator in said first timing module;

locking a phase locked loop of said first timing module to said clock signal of said local oscillator of said first timing module for providing a first timing module output;

locking a phase locked loop of said second timing module to said first timing module output for providing a second timing module output; and using said first timing module output as said internal timing signal.

3. The method of claim 2, further comprising the steps of:

identifying a timing module switchover condition;

generating a clock signal by a second local oscillator in said second timing module;

locking said phase locked loop of said second timing module to said clock signal of said second timing module for providing said second timing module output;

locking said phase locked loop of said first timing module to said second timing module output; and using said second timing module output as said internal timing signal.

* * * * *